United States Patent Office 3,817,729
Patented June 18, 1974

---

3,817,729
IDENTIFICATION OF REMNANTS OF MOULD RELEASING AGENTS ON GLASS CONTAINERS
Barbara A. Steele and Lieven H. Gevaert, Toronto, Ontario, Canada, assignors to Consumers Glass Company Limited, Etobicoke, Ontario, Canada
No Drawing. Filed Mar. 30, 1973, Ser. No. 346,584
Claims priority, application Canada, Feb. 22, 1973, 164,915
Int. Cl. C03b 9/30
U.S. Cl. 65—26
10 Claims

ABSTRACT OF THE DISCLOSURE

The remnants of mould releasing agent on a container may be detected by the addition of heat stable fluorescent and/or phosphorescent compounds to the mould releasing agent, by incorporating such a compound into the mould releasing agent or by having such a compound as an integral part of the mould releasing agent so that the remnants of the mould releasing agent on the container may be differentiated either optically and electronically or visually from the normal container.

FIELD OF INVENTION

This invention relates to improvements in the manufacture of glass containers. In particular, this invention relates to an improved method of manufacturing glass containers wherein a fluorescent and/or phosphorescent material is added to the mould releasing agent or is already incorporated into a mould releasing agent or is an integral part of mould releasing agent, such that the remnants of the releasing agent on the containers can be differentiated visually or optically and electronically on the ware.

PRIOR ART

In the manufacture of glass containers such as bottles, jars and the like, a swab compound or mould releasing agent is periodically applied to the glass forming moulds and neckrings. In the glass industry, mould releasing agents include the swab material applied to the moulds and/or to any other part of the mould equipment. The definition of mould releasing agent or swab compound is understood by those familiar with the industry.

A quantity of the swab compound or mould releasing agent periodically adheres to the surface of several of the bottles formed in the mould immediately after swabbing. Considerable difficulty has been experienced in detecting the presence of undesirable concentrations of the mould releasing agent on the ware by visual inspection. The inspection problems become more acute where the containers are formed with surface irregularities such as closure cap threads or mould blown glass decorations. The cost of making a detailed visual inspection of each individual bottle produced from a mould would be prohibited. Contamination by remnants of mould releasing agent is considered objectionable by the customers.

SUMMARY OF INVENTION

The present invention overcomes the difficulties of the prior art described above by providing an improvement in the method of manufacturing glass containers wherein any concentration of a fluorescent and/or phosphorescent material is added to the mould releasing agent prior to its application to the mould or is already incorporated into mould releasing agent or is an integral part of the mould releasing agent, whereby the presence of mould releasing agent or its remnants on the ware may be differentiated visually or optically and electronically on the ware by irradiating the containers with a suitable radiation or examining the container to ascertain the differences between contaminated and non-contaminated portions. Thereafter the container may be selectively accepted or rejected.

PREFERRED EMBODIMENTS

It has been found that if a fluorescent and/or phosphorescent material or any combination of such materials is added to the conventional mould releasing agent in any concentration, although preferably in the low concentration range of 0.01% to 1% by weight, or is already incorporated into a mould releasing agent or is an integral part of the mould releasing agent or is present in the mould releasing agent remnants on the ware, it can be differentiated visually or optically and electronically on the ware either by fluorescence and/or phosphorescence of the remnants, or by a change in fluorescence and/or phosphorescence of the glass containers. The presence of remnants of releasing agent on the containers formed in moulds which are treated with mould releasing agent may be detected by irradiating the containers with suitable radiation. The remnants of the mould releasing agent show up clearly when submitted to irradiation and the containers with remnants or mould releasing agent can be differentiated from containers with no remnants of mould releasing agents. The identification and rejection of the containers may be carried out on hot glass containers coming from the glass mould or at any point prior to the container entering the lehr or at any position in the lehr or on cooled glass containers which has passed through the lehr.

It will be apparent that in view of the temperatures to which the mould releasing agent or swabbing compound is subjected during the production of glass containers, the fluorescent and/or phosphorescent material which is added to the mould releasing agent or the properties of the mould releasing agent that allow it to be detected must be heat stable from room temperature up to the maximum temperature to which the mould releasing agent is subjected.

Without limiting the scope of the present invention, the following examples serve to illustrate alternative embodiments of the invention.

EXAMPLE 1

A manganese-activated zinc silicate was added to a mould releasing agent, and a ring dope agent, to a concentration of 0.1% by weight. The mixture of the manganese-activated zinc silicate and the mould releasing agent was applied as a swabbing compound to the mould in the glass forming process. The resultant containers made from the mould were cooled and light with a wavelength of 2537 angstrom units was shone over the containers. The resultant fluorescent and/or phosphorescent emanation from the residual mould releasing agent and remnant ring dope material was a bright green colour which was easily visible in a darkened room. Containers contaminated with remnants of mould releasing agent were easily detected.

EXAMPLE 2

A lead and manganese activated calcium silicate was added to a mould releasing agent and ring dope agent to a concentration of 0.1% by weight. The mixture of the lead and manganese activated calcium silicate and the mould releasing agent was applied as a swabbing compound to the mould in the glass forming process. The resultant containers made from the mould were cooled, and light with a wavelength of 2537 angstrom units was shone over the containers. The resultant fluorescent and/or phosphorescent emanation from the remnant mould releasing agent and ring dope material remnant was a bright orange colour which was easily visible in a darkened room.

Containers contaminated with remnants of mould releasing agent were easily detected.

From the two examples, it will be apparent that the characteristics of a suitable material which may be added to the mould releasing agent are fluorescent and/or phosphorescent in the visible, or ultraviolet range in low concentrations from about 0.01% or less to about 1% or more by weight and heat stable to the extent that any thermal decomposition that may occur does not remove the fluorescent and/or phosphorescent property of the compounds which are added to the mould releasing agent.

It will be apparent that while the present invention facilitates visual examination for remnants of mould releasing agent on the containers, the presence of a fluorescent and/or phosphorescent material or the properties of the mould releasing agent which allow it to be detected may also be detected by automatic light receiving devices so that the method is particularly suitable to automation.

The two above examples do not limit the scope of the present invention to added fluorescent and/or phosphorescent materials, but include mould releasing agents which have properties such that remnants of the mould releasing agents can be visually or optically and electronically detected, and include mould releasing agents which may be applied to the mould by different methods, for example, by spraying the mould and/or neckrings.

What we claim as our invention is:

1. In a method of manufacturing glass containers wherein a releasing agent is periodically applied to the glass forming mould, the improvement wherein a fluorescent and/or phosphorescent material is present in the mould releasing agent which is applied to the mould such that the presence of remnants of mould releasing agent on the containers after moulding may be detected by irradiating the containers with a suitable radiation capable of differentiating the remnants from the normal glass container to permit containers to be selectively accepted or rejected.

2. A method as claimed in claim 1 wherein the fluorescent and/or phosphorescent material is incorporated into the mould releasing agent.

3. A method as claimed in claim 1 wherein the fluorescent and/or phosphorescent material is an integral part of the mould releasing agent.

4. A method as claimed in claim 1 wherein the fluorescent and/or phosphorescent material may be differentiated optically and electronically or visually from the normal glass container.

5. A method as claimed in claim 1 wherein the fluorescent and/or phosphorescent material is present in low concentrations.

6. A method as claimed in claim 1 wherein the fluorescent and/or phosphorescent material is added in concentrations ranging from about 0.01% to about 1% by weight.

7. A method as claimed in claim 1 wherein the fluorescent and/or phosphorescent material is heat stable from about 75° F. to 1700° F.

8. A method as claimed in claim 1 wherein the fluorescent and/or phosphorescent material can be differentiated in the ultraviolet, visible or infrared radiation range.

9. A method as claimed in claim 1 wherein said fluorescent and/or phosphorescent material is manganese-activated zinc silicate.

10. A method as claimed in claim 1 wherein said fluorescent and/or phosphorescent material is a lead and manganese-activated calcium silicate.

References Cited

UNITED STATES PATENTS

| | | | |
|---|---|---|---|
| 2,649,500 | 8/1953 | Fedorchak | 65—29 X |
| 2,795,084 | 6/1957 | Littleton | 65—24 |
| 2,868,061 | 1/1959 | Fedorchak et al. | 65—29 X |

ARTHUR D. KELLOGG, Primary Examiner

U.S. Cl. X.R.

65—29